Figure 1:
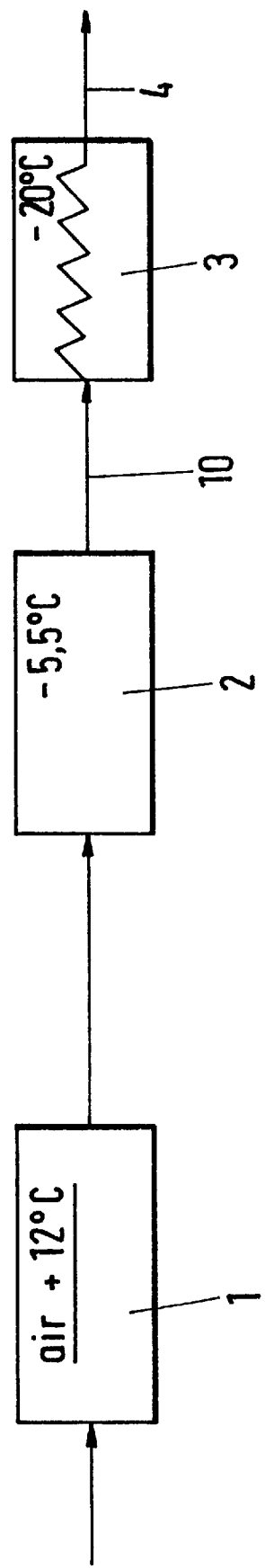

United States Patent [19]
Hoffmann et al.

[11] Patent Number: 6,082,120
[45] Date of Patent: Jul. 4, 2000

[54] APPARATUS AND PROCESS FOR COOLING FOAM PRODUCTS

[76] Inventors: Ralf Hoffmann, Wilhelmstrasse 44, Hattingen/Ruhr; Erich Windhab, Deichstrasse 30, Quakenbruck, both of Germany; Carl Hoyer, Grumstolsvej 27, Hojbjerg, Denmark; Friedrich H. F. Rogge, Seibelstrasse 40, Mettmann, Germany

[21] Appl. No.: 07/777,375

[22] PCT Filed: May 31, 1990

[86] PCT No.: PCT/DE90/00409

§ 371 Date: Feb. 5, 1992

§ 102(e) Date: Feb. 5, 1992

[87] PCT Pub. No.: WO90/14775

PCT Pub. Date: Dec. 13, 1990

[30] Foreign Application Priority Data

Jun. 5, 1989 [DE] Germany ............... 39 18 268

[51] Int. Cl.[7] ................................................ A23G 9/14
[52] U.S. Cl. ................................. 62/68; 62/342
[58] Field of Search ....................... 62/68, 342

[56] References Cited

U.S. PATENT DOCUMENTS

| | | | |
|---|---|---|---|
| 3,256,100 | 6/1966 | Bernstein et al. | 62/68 |
| 3,898,859 | 8/1975 | Duke | 62/135 |
| 4,179,904 | 12/1979 | McClenny | 62/342 |
| 4,201,558 | 5/1980 | Schwitters et al. | 62/70 |
| 4,275,567 | 6/1981 | Schwitters | 62/63 |
| 4,329,853 | 5/1982 | Mills | 62/308 |
| 4,551,025 | 11/1985 | Ames | 366/144 |
| 4,703,628 | 11/1987 | Togashi et al. | 62/135 |
| 4,817,386 | 4/1989 | Menzel | 62/342 |
| 5,024,066 | 6/1991 | Goavec | 62/342 |

FOREIGN PATENT DOCUMENTS

| | | |
|---|---|---|
| 56-29962 | 3/1981 | Japan . |
| WO 88/01473 | 3/1988 | WIPO . |
| WO 90/14775 | 12/1990 | WIPO . |

OTHER PUBLICATIONS

International Search Report for PCT/DE90/00409 dated Oct. 12, 1990.

*Primary Examiner*—William E. Tapolcai

[57] ABSTRACT

The invention relates to a process, a control unit, and a device for continuously deep freezing foams, e.g., edible foams, in particular ice cream and whipped cream, to the storage temperature, without using deep freezing tunnels.

14 Claims, 3 Drawing Sheets

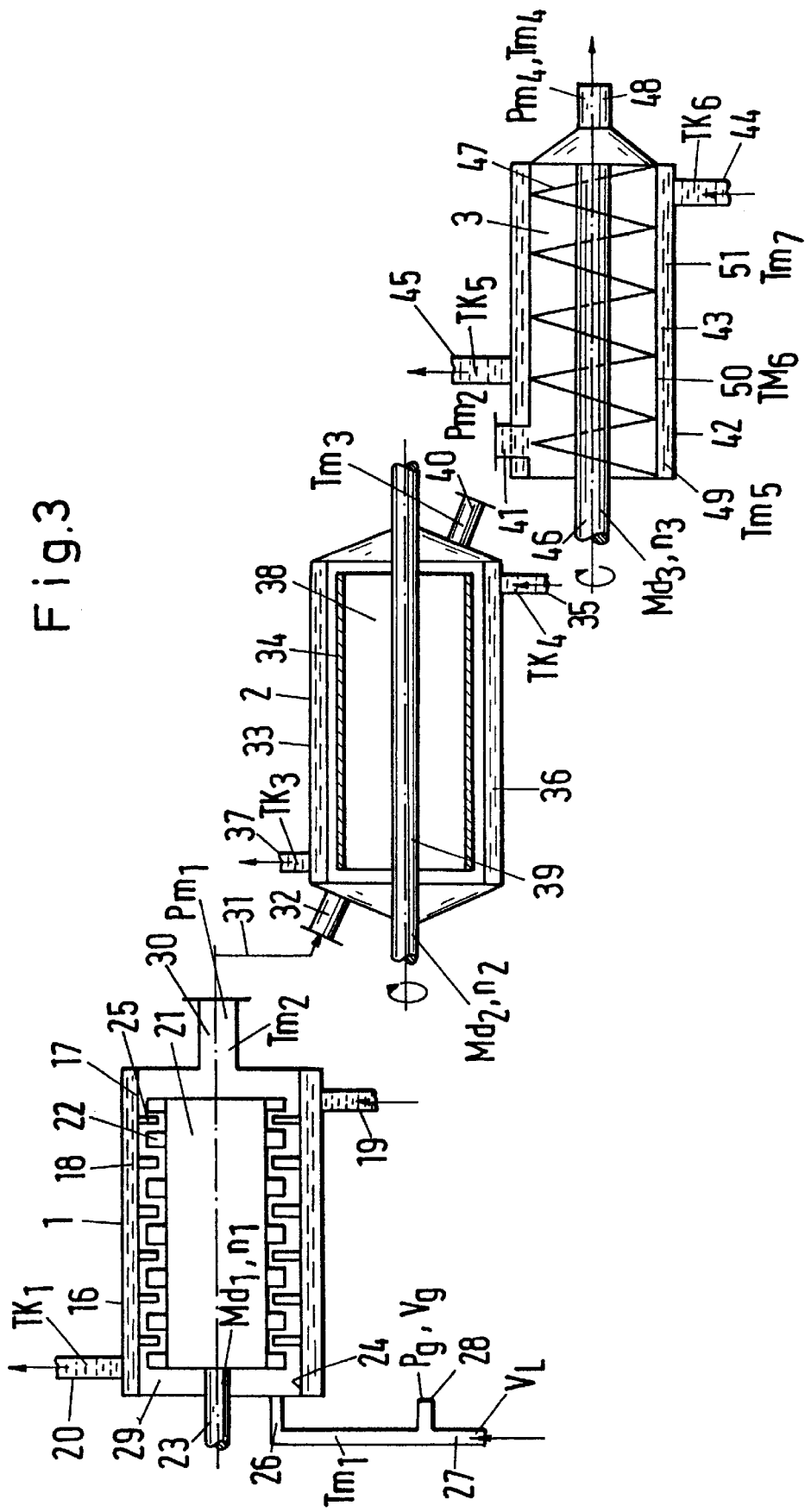

APPARATUS AND PROCESS FOR COOLING FOAM PRODUCTS

CATEGORIZATION

The invention deals with a process for the cooling of foam products, primarily edible foams, such as dairy products (ice-cream, whipped cream, fruit mousses, etc.).

In addition, the invention also deals with a control system for control of the process defined by the invention.

In addition, the invention also deals with a system incorporating a mixer system for beating of the basic product to be aerated and a cooling system for cooling of the edible foam.

PRIOR ART

Background Information

Foam products are made in many foodstuffs technology fields for the production of foodstuffs and/or luxuries. Such foam products offer on the one hand the advantage that they enhance the attractiveness and flavour of the product in which they are used and, on the other hand, that the inclusion of air results in an increase in their volume.

Two classical examples of such foodstuffs foams are whipped cream and ice-cream. In both these products, the incorporation of air approximately doubles their volume. The fine distribution of the air bubbles is a significant quality criterion in both ice-cream and whipped cream. In both the above-mentioned products, it is only this incorporation of air which makes the product suitable for consumption:

In whipped cream, the high fat content would prohibit the product's consumption in its original liquid form.

In ice-cream, the incorporation of air results in the ice-cream attaining a creamy consistency;

without the incorporation of air, it is merely a solid-frozen block.

The technologies for continuous aeration (incorporation of air) in whipped cream and ice-cream manufacturing are known around the world. The technologies for whipped cream and ice-cream do, indeed, differ from one another significantly, but their basic principle is nonetheless the same.

The distribution of deep-frozen products, and thus the sales of such, have more than doubled in recent years. Although deep-freezing was used initially only to keep vegetables fresh, the entire range of foodstuffs is nowadays available in the form of deep-frozen versions of all goods also available in fresh form. Having started with the deep-freezing of vegetables, the dissemination of deep-frozen food now ranges through ready-cooked meals on up to all types of bakery goods. Within this range of deep-frozen goods, ice-cream occupies a special and significant rank; in fact, for ice-cream this is the only possible marketing route, via a complete and uninterrupted deep-frozen chain. The industry has been making efforts to market cakes and gateaux on a whipped-cream basis in the form of deep-frozen products for some fifteen years. Continuously rising sales in this sector illustrate the great market potentials for this segment. The technology for manufacture of such deep-frozen cakes and gateaux is, however, largely underdeveloped, if one disregards the use of continuously operating automatic aerators.

Ice-cream manufacturing technology has not undergone any further significant technical changes since the introduction of continuous cooling and freezing systems (freezers). Here, work is still conducted on the same principles as were used thirty years ago, if one disregards technical modifications concerned solely with control of the ice-cream cooling and freezing system.

The Working Procedure Currently Customary for the Manufacture of Deep-Frozen Cakes and Gateaux A suitable jelling agent is added to the mixture of whipped cream and sugar. This whipped cream is then pasteurized and matured in maturation tanks for approx. 24 hours at +5° C. The cream is then fed by means of a conveying pump to the continuously operating aerator. This aerator is simultaneously supplied with compressed air. Both fluids are mixed with one another on a rotor-stator principle, resulting in the whipped cream absorbing air.

The whipping of cream results in a three-phase system, comprising the air, fat and serum phases.

Air bubbles are beaten into this emulsion, (aeration). A portion of the fat particles are destroyed in the process. The fat is present at low temperatures partially in solid crystallized form, a small portion of the fat, however, still being trapped in liquid form in fat particles. The mechanical effects of the rotor-stator system result in the disintegration of these fat particles. A portion of the free fat escapes. The beaten and the intact fat particles then accumulate on the air/serum boundary. Due to their hydrophobic properties, parts of fat particles project out of the monomolecular layers into the interior of the air bubbles. Free liquid fat serves to bind the solidified fat with it. In the serum phase, the number of intact fat particles decreases during whipping (aeration). The proteins remain in the serum phase. This cycle produces a stable foam (whipped cream). This foam is then transferred layer-by-layer into cake moulds using a filling system. The foam has a consistency which just permits transfer by means of volumetric feeders. The jelling agents present in the cream set only after the expiry of several minutes, i.e., they form a structure within the structure of the foam, the fat particles and the air bubbles being fixed in position by these structure-forming jelling agents. The water is also fixed simultaneously to these jelling agents. Following aeration and metered feeding of the cream into appropriate cake moulds, these cakes/gateaux are transferred to a solidifying tunnel for deep-freezing. During deep-freezing, the cakes/gateaux pass through an air current at approx. −45° C., and yield their heat to this current of air, resulting in them having a centre temperature of −18° C. after a cooling period of some two to three hours. In this relatively slow freezing cycle, the water present in the product freezes out in the form of larger crystals of ice. The formation of these ice crystals causes the partial destruction of the structure previously formed by the jelling agent. It is also possible for crystals of ice growing during the freezing process to puncture the tiny air bubbles, thus destroying the membrane of these air bubbles. This is not a significant disadvantage, provided the product remains frozen, i.e., the water is present in the product in solid form. During thawing of the product, the solid water in the ice crystals transforms into a liquid water phase. Concentration of the droplets of water occurs. The structure formed by the jelling agent and the emulsion consisting of air, fat and serum can then no longer fully contain these accumulations of water, which are greater than those present in the initial product, and the product becomes wet during thawing.

The relatively slow freezing process also results in the destruction of a portion of the air bubbles. This damage in the product is irreparable and results in a reduction of product volume during thawing.

This problem can, indeed, be countered by means of increased addition of jelling agents, a partial solution which, however, involves the disadvantage of affecting the flavour of the product. Deep-frozen whipped cream treated in this way no longer retains its fullness of flavour after thawing.

Contrary to the situation with other foodstuffs, the deep-freezing of whipped cream using the technology currently available does not constitute a method of preserving its quality. On the contrary, deep-freezing impairs this product's quality.

The Manufacture of Ice-cream

Ice-cream recipes normally consist of milk, skimmed milk, cream, milk concentrate, milk powder or butter, and sucrose, glucose or dextrose from fruit products, which can be added, and of hydrocolloids which act as stabilizers (vegetable binding agents, alginates, carrageenates, carob-bean flour, etc.).

For the manufacture of ice-cream, the individual components are weighed to accord with a specific recipe and adjusted to a defined ratio. These individual components are then mixed with one another in a mixing vessel. Mixing is completed after a fifteen-minute period of mixing at 63° C.

Mixing is followed by pasteurization at 80 to 85° C. for a period of 20 to 40 s.

After this heat treatment, the mixture is cooled to approx. 70° C. and then homogenized in a two-stage homogenizer, at 150 bar in the first stage, and 40 to 50 bar in the second stage. The fat particles are size-reduced in this process to below 2 $\mu$m.

This homogenization cycle is followed by cooling of the mixture down to 2 to 40° C. The mixture is then transferred to tanks, where it is available for further processing following a maturation period of 2 to 24 h. This maturation period results in swelling of the hydrocolloids, hydration of the casein and an increase in viscosity, the structure of the ice-cream becoming finer. Resistance to melting and aeration are improved simultaneously, the fat crystallizes out and a balanced aroma is formed.

After completion of the maturation cycle, this mixture is transferred to the cooling or freezing system for freezing and for simultaneous incorporation of air (aeration).

In present-day industrial practice, the mixtures for ice-cream are partially frozen in continuously operating cooling or freezing systems (freezers). A cutter shaft consisting of chromium-nickel steel rotates within a chromium-plated tube at a speed of approx. 200 rpm. The cutters continuously scrape off a thin film of ice forming on the refrigerated internal wall of the tube and also ensure intimate mixing of the air fed in this cylinder.

Frigen (registered trade mark) or ammonia is generally used within a −25 to −30° C. temperature range for refrigeration of the cylinder from outside. The small ice crystals desirable necessitate high-speed freezing, which is made possible by the highly cooled internal walls of the cylinder.

The mixture enters the freezing cylinder at a temperature of approx. 4° C. once the quantity of air necessary for aeration has been metered into it. The air is beaten into the mixture at the pressure of approx. 3 to 5 bar normally present in the interior of the cylinder. The freezing process occurs simultaneously, and the ice leaves the cooling or freezing system in paste form.

The maximum temperatures achievable using this process are −8° C.

The ice produced in this way is packed into tubs or cornets. These products must then be submitted to an after-freezing process, in order to achieve their storage temperature of −20° C. If this after-cooling process is not applied, the water-ice crystals present in the ice become larger, resulting in the ice having a rough and sandy flavour. The ice-cream cooling and freezing systems currently available on the market do not permit temperatures lower than −8° C.

Summary of Prior Art

The known processes discussed above can be used for the manufacture of ice-cream foams and their freezing down to the region around −7° C. This temperature, however, is not the correct storage temperature. It is necessary, rather, to achieve the storage temperature of −20° C. by means of after-solidification in deep-freezing tunnels. High levels of investment, for the deep-freezing tunnel in particular, are necessary for the implementation of this processing route. Continuous operating costs for energy are, in addition, substantial.

In the field of whipped-cream manufacturing, aeration processes which operate entirely in the positive temperature range are known. Freezing of whipped-cream foam products is completely unknown under these circumstances, however.

The Objective

The invention is based primarily on the objective of creating a process for the cooling of foam products, and primarily edible foam products such as dairy products (ice-cream, whipped cream), fruit mousse products, etc., which can be applied with relatively low energy costs.

In addition, the invention is based on the objective of creating a system of control for the performance of the process described by the invention.

Finally, the invention is based on the objective of providing a system of equipment for the performance of the process described by the invention.

Achievement of the Objective with Regard to the Process

This objective is achieved by means of the features detailed in Patent claim 1.

Certain Advantages

Firstly, the use of the process described in the invention makes it possible for the first time ever to cool edible foam products, i.e., not only ice-cream but also, for instance, whipped cream, down to storage temperature, i.e., down to −20° C., for instance, in one working cycle during and/or immediately following aeration. This means, for instance, that the water present in the whipped cream, etc., can be frozen to ice crystals of less than 20 to 30 $\mu$m size by means of extremely rapid cooling. The danger of the product becoming wet following thawing is significantly lessened with an ice-crystal size of 20 to 30 $\mu$m. Furthermore, the air distribution in the product is more stable, since damage to the air bubbles at such an ice-crystal size is scarcely conceivable.

The use of such a high-speed freezing process means that the fullness of flavour of the whipped cream can be preserved, the amount of jelling agents added reduced, and the approximation to a freshly produced product substantially enhanced. Finally, thanks to the absence of volume reduction, a geometrically stable product is achieved, which is of great advantage for the making of cakes and gateaux, for instance.

The combination of an aeration and freezing process thus makes it possible for the first time to continuously aerate and simultaneously deep-freeze a product such as whipped cream, for instance. After-freezing of cream products in a solidifying tunnel using cold air at approx. −45° C. is therefore no longer necessary. Since the minimum temperature of −18° C. or even lower is achieved even during the manufacturing process, a subsequent extra freezing process in any case becomes superfluous.

In addition, the utilization of the process described by the invention makes it possible to achieve ultra-fine distribution of water crystals. The use of the process described by the invention thus also makes it possible to produce edible foam products on a basis other than that of whipped cream and to convert them to a durable form using the freezing process. Products conceivable here are, for instance, fruit mousse products, such as aerated banana puree, and other dairy products, such as fruit yoghurts, etc.

The use of the process described by the invention makes it possible to produce completely new foods in a lightweight low-energy or low-calorie manner compatible with modern nutritional physiology. No such systems or processing methods are known anywhere in the world. Completely new sales prospects therefore appear.

In the manufacture of ice-cream masses, too, these can be aerated and simultaneously or immediately afterwards continuously frozen if the process described by the invention is used, and in such a way that no after-solidification by means of cold air at −45° C. is required in order to achieve the final storage temperature of −18° C. or −20° C., for instance. The process described by the invention makes the working stage of after-solidification of ice-cream completely superfluous, making possible a continuous process cycle of freezing and packing, with the result that the products manufactured in this way are ready for shipment immediately after packing.

The cooling process (after-solidification) to −20° C. by means of cold air is basically, as described above, extremely capital intensive as a result of the equipment needed, and extremely long cooling periods are required, since the average rate of freezing of an ice product from +5° C. down to −20° C. advances at only 1 cm/h, signifying, for instance, that a 6 cm cube of ice requires a minimum period of treatment with cold air of three hours in order to achieve a centre temperature of −20° C. A further disadvantage of these previously known time-intensive and equipment-intensive processes is an impairment of the product. At a temperature of −5 to −7° C., only 45 to 63% of the water present is frozen out. The remaining 40%, minus approx. 5% water, remains as so-called "free water" in the product. This 35% only freezes in the after-solidification process. Here, this water attaches itself to the water crystals already existing and results in the enlargement of these crystals. The larger the crystals of water, the less creamy the ice-cream tastes. After-solidification and the concomitant growth of the ice crystals results simultaneously in an impairment of the structure of the ice-cream. The structure changes from soft and creamy to hard and, in an extreme case, brittle.

The use of the process described by the invention completely eliminates all these disadvantages.

Despite the fact that the starting materials, primarily whipped cream and ice-cream, are in principle two different foodstuffs, the basic objective of manufacturing foam products by means of aeration and freezing them down to a temperature range at which they are suitable for storage can be attained without difficulty with the utilization of the process described by the invention.

The use of the process described by the invention therefore makes it possible for the first time ever to produce frozen foam products at −18 to −20° C. by means of beating (aeration) and obtain them continuously in a form ready for shipment in a single working cycle.

A further particular advantage is the fact that the energy costs for production of ice-cream using the process described by the invention are, for instance, lower by some 30% or even more than those involved in systems incorporating after-solidification tunnels, with the result that the process described by the invention can be said to function particularly economically.

Further Design Variants

A particularly advantageous variant of the process described by the invention is described in Patent claim 2.

Achievement of the objective with Regard to Control

This objective is achieved by means of the features described in Patent claim 3.

Certain Advantages

The frozen aerated foam leaves the system as a continuous product. All the parameters necessary for the production of this foam, such as exit temperature, quantity of air incorporated (beaten in), rate of freezing, etc., for instance, can be controlled. The control system keeps the actual system for performance of the process described by the invention in a stable condition suitable for the process.

Achievement of the Objective with Regard to the system of Equipment

This objective is achieved by means of the features described in Patent claim 4.

In the system of equipment described by the invention, the product to be aerated can be aerated with air at a temperature of, for instance, 12° C. The product aerated in this way is cooled in a cooling or freezing system down to, for instance, −5° C. and the foam thus pre-frozen. The foam pre-frozen in this manner is further cooled down to −20° C., for instance, in a suitable conveying system. The system components can be combined to form a single element. The system described by the invention completely eliminates the need for a deep-freezing tunnel.

Further Design Variant

An extremely advantageous design variant of the invention is described in Patent claim 5.

Certain Advantages

In this design variant, the product to be aerated is beaten in a system in which the aerated product is cooled either simultaneously or immediately after leaving the foam-production system in at least one deep-freezing system located immediately downstream and expelled by an extruder screw and immediately further processed. The foam leaving the extruder is ready for shipment and does not need to be "after-solidified".

Several extruder systems can also be operated in parallel and/or in sequence. It is possible, for instance, to operate several extruders in a co-extrusion configuration.

The product fed to the aeration system can be pre-cooled. It is also possible to feed pre-cooled foam product to the system and to cool this foam product to its storage temperature in the extruder system or in one or several system components connected to the extruder system.

Figure 2:
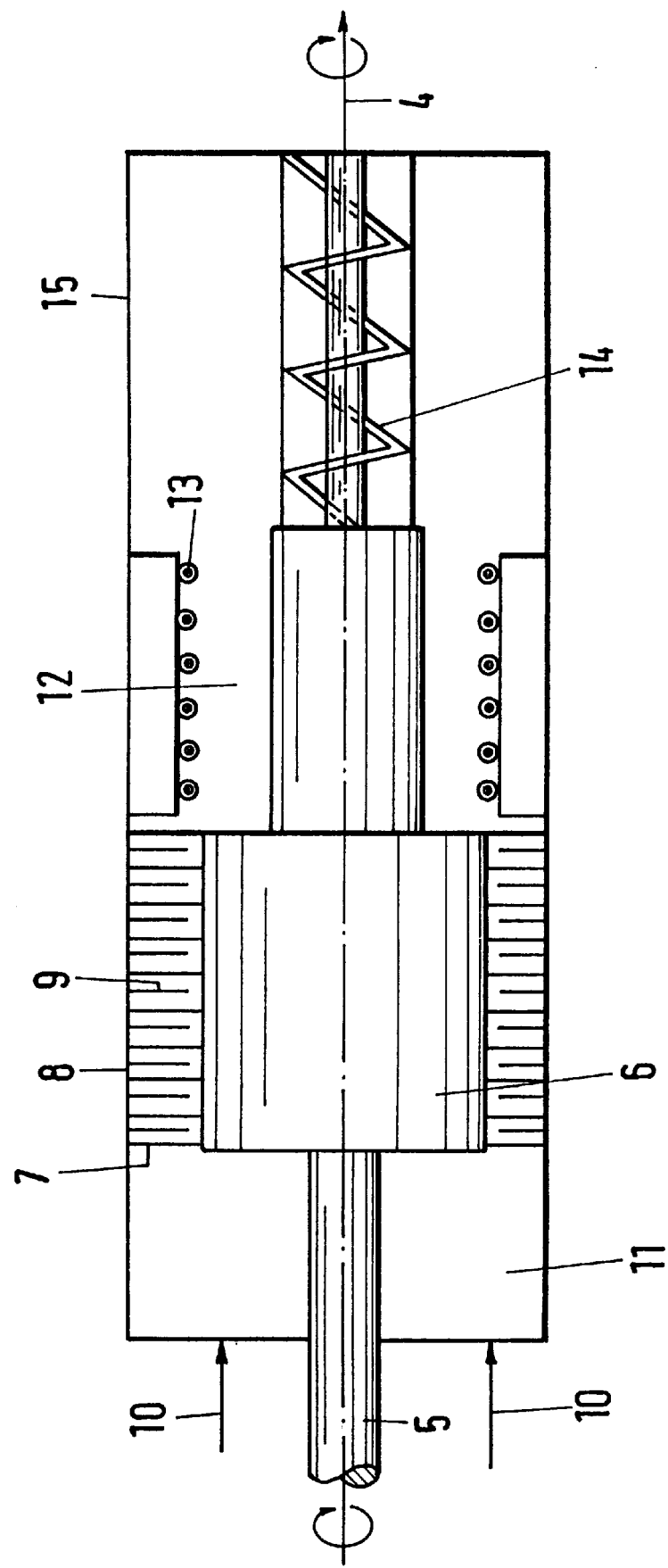

The invention is illustrated, in some cases schematically, by way of example in the drawing. These show, as follows:

FIG. 1 A process cycle as described by the invention in a schematic view;

FIG. 2 a detail from FIG. 1, at a larger scale, partially in section, and FIG. 3 a further design variant of the invention, partially in section.

The identification character 1 designates an aeration system in which the product to be aerated is aerated with the addition of, for instance, air. In aeration system 1, the foam can, for instance, have a temperature of 12° C.

The foam produced in this way leaves aeration system 1 in the direction indicated by the arrow and is fed to a cooling or freezing system (freezer), identified as 2, in which the foam is cooled down to, for instance, −5.5° C. The foam product 10 cooled in this way leaves the cooling or freezing system 2 in the direction indicated by the arrow and is fed to a combined extruder system 3. In extruder system 3, the pre-frozen edible foam product is cooled down to, for instance, −20° C. for storage and leaves the combined extruder system 3 continuously in the form of a ready-for-storage product 4 (foam product).

FIG. 2 shows the combined extruder system 3 schematically in cross-section. The identification character 5 designates a shaft driven by a motor which is not shown, the shaft being connected to a rotor 6. The rotor 6 has several vanes 7, which engage at intervals with a vane 9 located on a stator 8. The pre-frozen foam product 10 is fed into a chamber 11 and thus also to vanes 7 and 9. Suitable cooling systems for further cooling of the pre-frozen foam product 10 can be positioned in this area. The then intimately blended foam product 10 is cooled down to its storage temperature of, for instance, −20° C. in a downstream cooling system 12. Cooling coils 13 are indicated schematically in FIG. 2. The foam product cooled ready for storage is continuously discharged from the system via an extruder screw 14. The end section of extruder screw 14 opposite to shaft 5 is supported in a housing 15 indicated only schematically and can be driven by the same motor used for drive of shaft 5.

A further design variant of the invention is described in FIG. 3, which constitutes a more detailed elaboration of the variant shown in FIG. 1.

Identification character 1 designates the aeration stage or aeration system, character 2 the pre-freezing stage or the cooling or freezing system and character 3 the deep-freezing stage or the combined extruder system. The aeration system consists essentially of a housing 16, which features a further internal tubular housing 17, which is located coaxially relative to the outer housing 16, with the result that an annular space 18 remains between the outer and inner housings 16 and 17, a refrigerant supply line 19 being connected to one end of the annular space, and a refrigerant discharge nozzle 20 to the other end of the annular space. The refrigerant discharge nozzle 20 is connected to a suitable line, not shown in more detail. Refrigerant thus flows through annular space 18. A suitable brine, Frigen (registered trade mark) or similar can be used as the refrigerant.

A rotor 21 with numerous vanes 22 distributed across its circumference and its length and driven via a shaft 23 by means of a motor not shown is located within the inner tubular housing.

Numerous vanes 25 which engage without contact with vanes 22 are also located across the circumference and length of the inner wall 24 of the inner housing 17.

A feed line 26 is connected to the end of housing 16 facing shaft 23. The relevant fluid, i.e., the starting components for the fluid to be aerated, is fed at one end 27 of this L-shaped component of feed line 26, while a suitable aeration gas, generally air, is fed through pipe 28 into feed line 26. Fluid and carrier gas/air thus enter the inner chamber 29 and are intimately mixed with one another by means of series of vanes 22 and 25. The materials pre-aerated in this aeration system 1 leave aeration system 1 via pipe-nozzle 30 in the direction indicated by arrow 31 and are transferred to pipe-nozzle 32, which is connected to a housing 33 of the cooling or freezing system 2.

The fluid and carrier gas are pre-cooled during passage through the aeration system 1, the refrigerant and fluid moving in counter-flow relative to one another, as is also the case in all other stages, i.e., aeration system 1, cooling or freezing system 2, and deep-freezing stage 3.

In cooling or freezing system 2, the foam product passes through an annular chamber 34, around which refrigerant flows externally, the refrigerant being fed via a feed line 35 into an annular chamber 36 and leaving this annular chamber 36 via a discharge line 37.

A rotor 38, which is motor-driven via a shaft 39, is located coaxially with annular chambers 34 and 36.

The pre-frozen foam product is discharged via a nozzle 40 and fed via connecting nozzle 41 to a housing 42 of the deep-freezing stage.

Housing 42 of the deep-freezing stage itself features an annular chamber 43, to which a line 44 is connected for feed of refrigerant. The refrigerant leaves annular space 43 via a line 45.

A conveying screw 47 motor-driven via a shaft 46 is located coaxially with annular chamber 43 and extracts the deep-frozen foam via a nozzle 48. The deep-frozen foam product is then further processed as required, packed and shipped.

Identification characters 49, 50 and 51 indicate thermocouples, using which the temperature of the deep-frozen foam product can be measured at various points in the deep-freezing stage.

In FIG. 3, $V_L$ indicates the volumetric flow of the fluid fed, $V_g$ the volumetric flow of the carrier gas fed, $P_g$ the pressure of the carrier gas fed at pipe 28, $Tm_1$ the temperature in feed line 26, $Md_1$ the torque on shaft 23, $n_1$ the speed of shaft 23, $TK_1$ the temperature in refrigerant discharge nozzle 20, $Pm_1$ the pressure in pipe nozzle 30, $Tm_2$ the temperature in pipe nozzle 30, $TK_2$ the temperature in refrigerant supply line 19, $TK_3$ the temperature in discharge line 37, $Md_2$ the torque on shaft 39, $n_2$ the speed of shaft 39, $TK_4$ the temperature in feed line 35, $Pm_2$ the pressure in nozzle 40, $Tm_3$ the temperature in nozzle 40, $Md_3$ the torque on shaft 46, $n_3$ the speed of shaft 46, $Tm_5$, $Tm_6$ and $Tm_7$ the temperatures of deep-frozen foam product measured in the deep-freezing stage by thermocouples 49, 50 and 51 respectively, $TK_6$ the temperature in line 44, $Pm_3$ the pressure in nozzle 48 and $Tm_4$ the temperature in nozzle 48.

The identification characters 19, 20, 35, 37, 44 and 45 indicate the individual refrigerant supply and discharge components for the individual process stages.

The refrigerant temperatures measured at the corresponding points are indicated by $TK_1$ to $TK_6$. These temperatures are measured at the corresponding points by means of thermocouples.

Further temperature measurements are taken at the respective product exits from the individual process stages, identification characters 20, 40 and/or 48, temperatures $Tm_2$, $Tm_3$ and $Tm_4$. In addition, pressure and/or differential pressure is measured at the same points in order to measure consistency (viscous pressure drop); $Pm_1$, $Pm_2$ and/or $Pm_3$.

Power consumption and/or torque measurement $Md_1$ to $Md_3$ and speed measurements $n_1$ to $n_3$ are taken for the drive devices for the individual process stages, identification characters 1 to 3.

Both volumetric flow $V_L$ and $V_g$ (27 and 28) are determined for the starting components (fluid and gas) metered in, as is metering pressure $P_g$ (28) for the gas and mixture temperature $Tm_1$ for the mixture of the starting components (26).

In the final process stage (the deep-freezing stage), the mass temperature of the mass to be deep-frozen in this process stage ($Tm_5$ to $Tm_7$) is determined additionally at three points in order to permit checking of the temperature profile across the length of the process stage.

The target variables in the manufacturing process for deep-frozen foam products are mass temperature $Tm_4$ at the exit from the deep-freezing stage and the pressure or differential pressure $Pm_3$ (viscous pressure loss) measured at this point, which provides a measure of the consistency of the deep-frozen foam matrix leaving the system. The following input parameters must be selected on the basis of the experience gained in development of the recipe and their constancy checked and regulated if necessary in order to attain the defined targets:

Fluid and gas volumetric flow $V_L$ and $V_g$, gas pressure $P_L$, the power data for drive units $Md_1$ to $Md_3$ and $n_1$ to $n_3$, and the inlet temperatures of the refrigerant at entry to the individual process stages $TK_2$, $TK_4$ and $TK_6$ and the inlet mixture temperature $Tm_1$ at 17, and the counterpressure in aeration stage $Pm_1$.

The coolant exit temperatures at exit from the individual process stages $TK_1$, $TK_3$ and $TK_5$ and mass temperatures $Tm_2$, $Tm_3$, $Tm_4$, $Tm_5$, $Tm_6$ and $Tm_7$ and exit pressure $Pm_2$ from the pre-freezing stage are determined purely as check parameters.

The decisive manipulated variables for foam aeration are the volumetric flows of gas and fluid $V_g$ and $V_L$, while the power inputs to the individual process stages $Md_1$ to $Md_3$; $n_1$ to $n_3$ and the speed of the cooling cycle in the deep-freezing stage which is determined essentially by the inlet temperature of the cooling fluid $TK_6$ (identification character 44) are decisive for the setting of the consistency target variables $Pm_3$ and $Tm_4$.

List of identification characters

1 Aeration system
2 Cooling or freezing system (freezer)
3 System for transportation and deep-freezing, combined extruder system, deep-freezing stage
4 Foam, product
5 Shaft
6 Rotor
7 Vanes
8 Stator
7 Vanes
10 Foam, pre-frozen
11 Chamber
12 Cooling system
13 Cooling coils
14 Extruder screw, screw
15 Housing, tubular
16 Housing, tubular
17 Housing, inner
18 Annular chamber
19 Refrigerant feed line
20 Cooling discharge nozzle
21 Rotor
22 Vane
23 Shaft
24 Inner wall
25 Vane
26 Feed line
27 End
28 Pipe
29 Inner chamber
30 Pipe nozzle
31 Direction indicated by arrow
32 Pipe nozzle
33 Housing
34 Annular chamber
35 Feed line
36 Annular chamber
37 Discharge line
38 Rotor
39 Shaft
40 Nozzle
41 Connecting nozzle
42 Housing
43 Annular chamber
44 Line
45 Line
46 Shaft
47 Conveying screw
48 Nozzle
49 Thermocouple
50 Thermocouple
51 Thermocouple
$Md_1$ torque on shaft 23
$Md_2$ Torque on shaft 39
$Md_3$ Torque on shaft 46
$n_1$ Speed of shaft 21
$n_2$ Speed of shaft 39
$n_3$ Speed of shaft 46
$P_g$ Pressure of carrier gas fed in pipe 28
$P_L$ Gas pressure
$Pm_1$ Pressure in pipe nozzle 30
$Pm_2$ Pressure in nozzle 40
$Pm_3$ Pressure in nozzle 48
$Tm_1$ Temperature in feed line 26
$Tm_2$ Temperature in pipe nozzle 30
$Tm_3$ Temperature in nozzle 40
$Tm_4$ Temperature in nozzle 48
$Tm_5$ Temperature on thermocouple 49
$Tm_6$ Temperature on thermocouple 50
$Tm_7$ Temperature on thermocouple 51
$TK_1$ Temperature in refrigerant discharge nozzle 20
$TK_2$ Temperature in refrigerant feed line 19
$TK_3$ Temperature in line 37
$TK_4$ Temperature in feed line 35
$TK_5$ Temperature in line 45
$TK_6$ Temperature in line 44
$V_1$ Volumetric flow of fluid at entry to line 27
$V_g$ Volumetric flow of carrier gas at entry to line 28

We claim:

1. A process for mixing and deep freezing an edible foam to storage temperatures, said process comprising:
    a) aerating the foam;
    b) pre-freezing the foam;
    c) deep-freezing the foam to storage temperature; and
    d) extruding the deep-frozen foam
wherein the deep-freezing and extruding occur in a combined extruder system.

2. The process of claim 1, wherein the foam is continuously discharged from the combined extruder system via an extruder screw.

3. Apparatus for producing and deep-freezing an edible foam, comprising:

a) an aeration system;

b) a pre-freezing system; and c) a deep-freezing system;

wherein said aeration system, pre-freezing system and deep-freezing system are connected by piping.

4. The apparatus of claim 3, wherein the aeration system is further defined as comprising an outer housing, said outer housing containing a further internal tubular housing having an inner wall and an outer wall, said inner housing being coaxially located within said outer housing such that an annular space is defined between the outer housing and inner housing.

5. The apparatus of claim 4, wherein said inner tubular housing is further defined as comprising a rotor having numerous vanes distributed across its circumference and its length, said rotor being driven by a shaft located at one end of said outer housing.

6. The apparatus of claim 5, further defined as comprising numerous vanes located across the circumference and length of the inner wall of the inner housing, said vanes engaging without contact the vanes located across the circumference and length of the rotor.

7. The apparatus of claim 6, further comprising a feed line connected to said housing at the same end of the shaft, wherein the starting foam to be aerated enters the aeration system via the feed line, and wherein an aeration gas enters the feed line downstream of said foam such that said foam and said aeration gas enter the aeration system together and are intimately mixed via said vanes to produce aerated foam.

8. The apparatus of claim 7, wherein said aerated foam and aeration gas leave the aeration system and enter the pre-freezing system via a pipe nozzle.

9. The apparatus of claim 7, wherein the foam and aeration gas are pre-cooled during passage through the aeration system.

10. The apparatus of claim 7, wherein the foam moves in counter-flow relative to the aeration gas.

11. The apparatus of claim 8, wherein the pre-freezing system comprises at least a first and a second annular chamber surrounding said first annular chamber, said second annular chamber comprising a feed line through which refrigerant enters said second annular chamber and a discharge line through which the refrigerant exits said second annular chamber, wherein said aerated foam and aeration gas enter said first annular chamber and pass through said first annular chamber via a motor-driven rotor located coaxially within said first annular chamber, wherein the rotor moves the aerated foam through the pre-freezing system to a nozzle connecting the pre-freezing system to the deep-freezing system.

12. The apparatus of claim 11, wherein the deep-freezing system comprises at least a first and a second annular chamber surrounding said first annular chamber, said second annular chamber comprising a feed line through which refrigerant enters said second annular chamber and a discharge line through which refrigerant exits said second annular chamber, wherein said pre-frozen foam passes through said first annular chamber via a motor-driven conveying screw located coaxially within said first annular chamber.

13. The apparatus of claim 12, wherein the conveying screw extracts deep-frozen, reday to package foam via a nozzle.

14. The apparatus of claim 13, wherein the deep-freezing system further comprises means for measuring the temperature of the deep-frozen foam at one or more points along the deep-freezing system.

* * * * *